March 26, 1968    R. G. ADAMS    3,375,155

TREATMENT OF FIBROUS GLASS

Filed Aug. 15, 1966    2 Sheets-Sheet 2

Fig. 2.

INVENTOR.
RICHARD G. ADAMS
BY KENYON & KENYON
ATTORNEYS

United States Patent Office 3,375,155
Patented Mar. 26, 1968

---

3,375,155
TREATMENT OF FIBROUS GLASS
Richard G. Adams, Upper Montclair, N.J., assignor to J. P. Stevens & Co., Inc., New York, N.Y., a corporation of Delaware
Continuation-in-part of application Ser. No. 284,220, May 29, 1963. This application Aug. 15, 1966, Ser. No. 572,249
10 Claims. (Cl. 161—93)

ABSTRACT OF THE DISCLOSURE

A process for heat-cleaning fibrous glass, such as textiles, in such a manner as to inhibit strength loss by following the steps of treating the glass with an oxygen yielding salt of potassium, sodium, cesium and rubidium, drying the treated glass (if not already dry), and then heating the fibrous glass at a temperature of between about 600° F. and 1250° F. until substantially all of the sizing has been removed, i.e, until the ignition loss is about 0.1% or less. Optionally, further heat treatment is applied to increase tensile strength.

Also, the fibrous glass which has been desized according to the foregoing procedure, said glass being characterized by a tensile strength of at least 70% of that of the untreated greige fabric, and having an excellent white color.

---

This invention relates to the production of heat-cleaned fiber glass and is a continuation-in-part of my earlier application of the same title Ser. No. 284,220, filed May 29, 1963, now abandoned. The invention relates more particularly to a method for heat-cleaning fiber glass fabric in a manner which gives a good white color and minimizes strength loss.

To protect glass fibers a coating of sizing is applied to the surfaces thereof as soon after the spinning of the fibers as is practical. The sized fibers are then usually woven or fabricated into the fabric form. Prior to dyeing and finishing, the sizing must be removed from the glass fibers. The generally accepted method of removing sizing in the fiber glass art involves the use of treatment at elevated temperatures.

In general, heating the fiber glass to high temperatures results in the removal of the sizing material and any other thermally sensitive compounds, such as lubricating oils, present on the fibers. A distressing problem in the fiber glass heat-cleaning art is the steady degradation of the strength of the fabric which obtains during such cleaning, especially when such heating is carried on for a time sufficient to achieve an acceptable white color. The patent literature in this area is evidence of the continuing search for new and better methods of heat-cleaning which will not suffer from the disadvantage of strength degradation.

U.S. Patent No. 2,633,428 issued to C. Klug on Mar. 31, 1953, describes a process commonly referred to as Coronizing. The Coronizing process involves exposing the fiber glass fabric to air in a furnace maintained at elevated temperatures, for example, between 1100° F. and 1400° F. Cleaning is accomplished by combustion on the surface of the fabric of the sizing material and oils. The Coronizing process causes considerable degradation of the tensile strength of the processed fabric.

U.S. Patent No. 2,970,934 issued to M. R. May on Feb. 7, 1961, describes a method which is reported to be superior to Coronizing in respect of the tensile strength of the cleaned fabric. The May patent discloses a process in which the fabric is introduced into a furnace, much in the same manner as Coronizing. However, the amount of oxygen supplied to the furnace is limited to an amount sufficient "only to support combustion of the size with a yellow, carbon-containing, wide, lazy flame, as distinguished from a blue flame" (see column 2, lines 61–63).

Both the Coronizing process and the process described in the above patent issued to M. R. May are discussed in U.S. Patent No. 3,012,845 issued to E. L. Lotz on Dec. 12, 1961. According to Lotz, the Coronized fabric has a tensile strength which is only about 30% to 60% of that of the greige goods (see Lotz, column 2, beginning at line 20).

According to Lotz, although the process described by May in the above patent provides an improvement in tensile strength, the fabric does not exhibit a white color.

U.S. Patent No. 2,674,549 issued to E. H. Balz describes a process wherein the sized fiber glass fabric is soaked in a solution of alkali chlorate and then placed, while wet, into a furnace at very moderate times (30 seconds to 1½ minutes) and temperatures (650–750° F.). Balz showed that the presence of the chlorate oxidizing salt assisted in the removal of the sizing. However, the heat-cleaning step, though short, was not always successful in giving a white product and frequently a time-consuming after-treatment of bleach was necessary to achieve acceptable white color. There is evidence as well that modest time-temperature heating conditions in the presence of a chlorate solution result in excessive loss in fabric strength.

Accordingly, it is an object of this invention to provide a process for heat-cleaning fiber glass which minimizes strength loss.

It is a further object of the present invention to provide a process for heat-cleaning fiber glass to an excellent white color.

It is another object of the present invention to provide a process for minimizing the time required to obtain an acceptable white heat-cleaned fiber glass fabric, while simultaneously minimizing the strength loss associated with heat-cleaning.

It is a further object of the invention to provide a process for heat-cleaning fiber glass which is applicable to a wide range of temperatures and time conditions.

It is another object of the present invention to provide a cleaned white fiber glass fabric of relatively high tensile strength.

Briefly stated, one embodiment of the present invention is a method of heat-cleaning fibrous glass to remove the sizing materials comprising the steps of treating the glass with a substance comprising a cation selected from the group consisting of sodium, potassium, cesium and rubidium, and an anion decomposable by heat to provide oxygen, and heating the glass, while dry, to a temperature in the approximate range of 600° F. to 1250° F. for a period of time at least sufficient to remove substantially all of the sizing material.

It has been discovered that when a fibrous glass fabric is subjected to the above treatment, the resulting fabric is not only sufficiently white to obviate the necessity of any bleaching treatment, but the fabric is unusually strong as compared with ordinary heat-cleaned fabrics.

Thus, by following the teachings of the present invention there may be obtained, for the first time, a heat-cleaned fibrous glass fabric which has an excellent white color and which has a tensile strength, when finished, that is no less than 70% of that of the greige fabric.

It has been found that, unlike ordinary heat-cleaned fabrics wherein tensile strength steadily decreases with increased heating time, the fibrous glass materials treated according to the present invention actually exhibit a pronounced slowing down in strength degradation, even to the point of frequently exhibiting an increase in strength with continued heating. This minimizing of the strength loss which normally attends the heat-cleaning process is characteristic of the present invention and is wholly unexpected. The actual degree to which the strength loss is minimized, and the extent of any actual strength increase is dependent upon a number of factors, particularly the selection of cation, the temperatures used, and the time of heating.

By treating a fibrous glass gabric according to the process of the present invention it is possible to heat-clean a fabric to an acceptable white color in far shorter time than would be required in the absence of such a process. Moreover, the resultant fabric will be strong or stronger than the untreated fabric heated at the same temperature for an equivalent time, and it will be much stronger than an untreated fabric which has been heated for a sufficient time to produce equivalent whiteness.

According to the process of the present invention, the time of heating of the fibrous glass, irrespective of the temperature chosen, is at least that required to remove substantially all of the sizing materials. The time required to accomplish this will naturally decrease with increasing temperature. Moreover, the time required is also dependent upon the weight of the fabric chosen (longer time for heavier fabrics) and upon the specific nature and amount of sizing on the glass fiber. Obviously, no precise range of time conditions can be set for a given temperature; the precise time for each given situation must necessarily be arrived at empirically, a procedure that is well within the skill of those versed in the art, once the criteria for whiteness, furnace temperature, and the like, are considered.

In any event, the time is at least that required to remove substantially all of the sizing materials, and this condition is readily ascertained by means of an ignition loss test. As defined herein, substantially all of the sizing has been removed when the ignition loss is about 0.1% (by weight) or less.

An even more convenient means of measuring sizing removal is through measurement of the whiteness of the fabric; that is, an acceptable white heat-cleaned material is substantially free of sizing. There are various means available to measure whiteness and one of these is the photoelectric reflection meter. Measurements taken with such an instrument are found to correlate relatively well with ignition loss and hence provide a quick check on the state of cleanliness of the fabric.

The foregoing attributes of the present invention are more readily understood by reference to the figures, in which.

Figure 1:
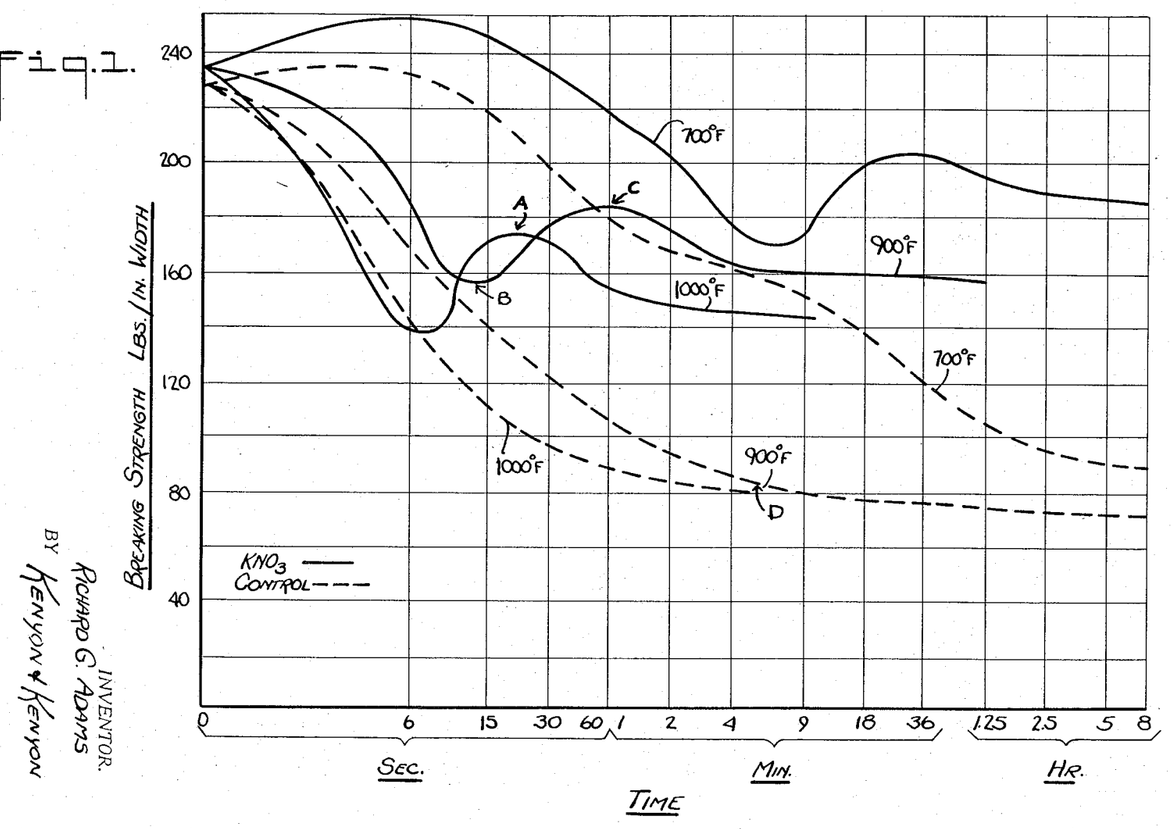
FIG. 1 illustrates the time-strength relationship at different temperatures of a fibrous glass fabric treated according to one embodiment of the present invention as well as the corresponding time-strength relationship of an untreated control fabric.

Referring first to FIG. 1, there is shown in solid lines a semi-logarithmic plot of time against tensile (or breaking) strength (in pounds per inch width) of various specimens of glass fabric that have been treated by a solution of potassium nitrate, dried, and then heated at given temperatures. In this instance potassium has been selected as representative of the cations useful in treating the fibrous glass according to the invention, and nitrate has been selected as a suitable anion decomposable by heat to form oxygen. Each curve, of FIG. 1, for a given temperature has been obtained by heating several samples of potassium nitrate-treated E glass fabric for various times, testing each such sample after finishing for tensile strength, plotting the resultant time-strength points on the graph and then drawing a smooth curve through the data points. The point at zero time represents the strength of a greige fabric. The conditions used as well as the testing methods are discussed more fully hereinafter with reference to Examples 1 and 2.

As shown in FIG. 1, the time-strength relationship was obtained for four widely different temperatures, i.e. 650°, 700°, 900° and 1000° F. It will be noted that there are certain common characteristics shared by all four curves:

(1) All curves show a characteristic decreasing strength shortly after heating is begun. A small initial strength rise at the lower temperature (650–700° F.) is quickly dissipated. The strengths all decrease for a given period of time and then as heating is continued, there is an unexpected slowing down in the strength loss followed by a noticeable increase in strength to a maximum value, and, eventually a tapering off of the strength at a value that is not below the lowest initial value.

(2) The times at which the various samples exhibit the characteristics described in (1) above, and more particularly, the point at which the strength decrease inverts to a strength increase differ from one to the other depending on the temperature of heating.

Quite noticeably, the higher the temperature, the earlier the effects are exhibited. Thus, at 1000° F. the strength loss terminated at about 6 seconds, whereas at 700° F. the corresponding point did not occur until about 6 minutes of heating.

The maximum strength values shown by each sample (corresponding, for example, to the point A on the 1000° curve) follow the same pattern.

(3) The maximum strengths, such as that represented by the point A on the 1000° F. curve, become lower as the heating temperature is increased. Thus, at 1000° F. the maximum strength valve is about 175 pounds/in. width, whereas at 700° F. the maximum value is about 203 pounds/in. width. In each case, however, the maximum strength value is well above 70% of the original greige strength—a remarkably high strength for a heat-cleaned glass fiber. Indeed, at the lower temperatures, as for example 650° F., at no time does the strength fall below about 80% of the original greige strength and actually reaches a maximum value (after about 5 hours of heating) of about 90% of the greige strength.

An interesting and significant phenomenon occurs as a fibrous glass fabric is heated for various times at given temperatures as depicted in FIG. 1. It has been found that irrespective of the temperature of heating, the point at which the fabric has been heat-cleaned sufficiently to remove substantially all of the sizing thereon corresponds generally to the point of strength inversion. For example, the specimen heated at 900° F. as shown in FIG. 1 was cleaned substantially free of sizing after about 14 minutes, i.e. at a point in time corresponding well with the inflection point B in the strength curve.

Therefore, according to the present discovery, in order to obtain a good white glass fabric as well as one having a minimized strength loss, it would be necessary to heat the treated fabric at least until the sizing is substantially removed (i.e. to point B) and preferably beyond (i.e. to point C). That is, it is in the time area of the inversion point, or conversely, the point of substantially removal of sizing, and beyond, that the invention plays its most important role.

This is particularly evident when the solid curves of FIG. 1 are compared with the dashed curves of FIG. 1. These lines depict the strength values for control specimens of fibrous glass fabrics that were processed and tested identically to those prepared according to the invention except, of course, they were not treated with the cation-oxidizing agent of the invention.

By comparing the strength values for specimens heated at the same temperature it is readily apparent that the process of the invention has a pronounced beneficial effect upon the strength of the fabric. The control samples show the expected deleterious strength loss pattern which is associated with ordinary heat-cleaned glass fibers. It is noted that the curves for the control samples roughly follow those of the $KNO_3$ treated fabrics during the initial heating period, and then although the strength loss of the treated samples is inhibited as described above, the control samples continue to exhibit a steady strength loss.

Equally revealing is the fact that the control samples did not become substantially free of sizing until heated for a far longer time than was required for the treated samples. For example, at 900° F. it took over 5 minutes (corresponding to point D of FIG. 1) before the control sample was cleaned to an excellent white color. The corresponding point for the treated sample at 900° F. took less than 12 seconds (point B of FIG. 1). Significantly, the strength of the control sample at the time it became cleaned to an excellent white was about 90 lbs./in. width as compared with about 159 lbs./in. width for the treated sample. Moreover, continued heating of the treated sample actually increased the strength of the sample to a maximum value of 186 lbs./in. width (point C of FIG. 1) while simultaneously improving even further the whiteness of the fabric. By way of contrast, continued heating of the control fabric at 900° F. caused a continuing slow decline in strength without any substantial improvement in fabric color.

Figure 2:
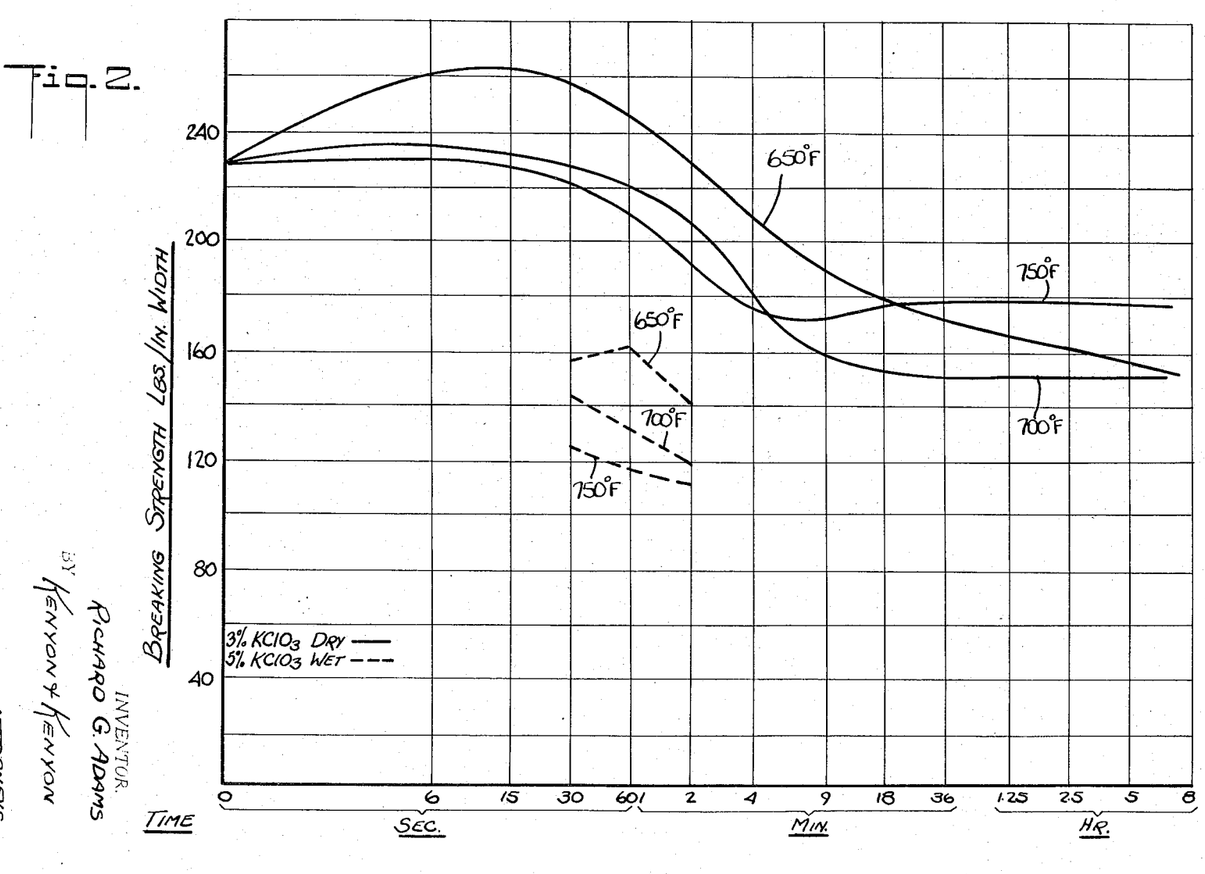
FIG. 2 describes the time-strength relationship at different temperatures of a fibrous glass fabric treated according to another embodiment of the present invention, as well as a corresponding time-strength relationship of a fabric treated according to one of the known heat-cleaning processes.

In FIG. 2 the solid lines represent the strength-time curve at the given moderate temperatures for a fibrous glass fabric which has been treated with potassium chlorate according to the process of the present invention. With the exception of the use of the chlorate anion as the source of oxygen rather than nitrate, the process used for FIG. 2 was otherwise identical to that used for FIG. 1.

FIG. 2 shows that a treatment with potassium chlorate gives slightly different time-strength behavior than treatment with potassium nitrate. The former does not exhibit any substantial increase in strength as heating is continued. Nonetheless, the precipitous loss in strength that is associated with ordinary heat-cleaning, as represented by the control fabric curves of FIG. 1, is largely abated. A comparison of the strength values at 700° F., for example, of the $KClO_3$-treated material (FIG. 2) and the untreated control (FIG. 1) readily points up the fact that a considerable relative improvement in strength has been achieved by the $KClO_3$ treatment. This is all the more evident when the two fabrics are compared at the point when each has been substantially de-sized. For the $KClO_3$-treated fabric at 700° F. this point was achieved after about 9 minutes of heating and at a strength value of 152 lbs./in. width. The corresponding point for the control fabric was reached only after about 36 minutes of heating and at a strength value of 122 lbs./in. width. Thus the control took about four times as long to get clean, and, as cleaned, was about 20% less strong.

FIGS. 1 and 2 show that the relative improvement of the invention may vary depending upon the particular oxidizing agent used. The fact that the nitrate anion gives a superior performance compared to the chlorate anion may be caused by the decomposition of the chlorate to the chloride form. The chloride salt is relatively infusible at the furnace temperatures encountered and therefore tends to inhibit good surface contact between the cation and the glass fiber. On the other hand, the nitrate salts remain in the fused state throughout the heat-cleaning process and therefore permit good contact of the active materials with the fiber surface.

Referring again to FIG. 2, there is shown in dotted lines the strength-time relationship at given temperatures for a glass fabric which has been treated with a solution of potassium chlorate and introduced into the heating furnace while still wet. This procedure, when confined to the time limits of 30 seconds to 1½ minutes, is in accordance with the teachings of the aforementioned Balz Patent No. 2,674,549. This procedure improved the rate of cleaning as compared with the control fabric; however, there was no noticeable abatement in the strength loss. Indeed, the strengths were considerably below those of the $KClO_3$ embodiment of the process according to the present invention (wherein the treated glass fabric is dry rather than wet when placed into the furnace), as may be seen by a comparison of the dotted lines in FIG. 2 with the corresponding solid lines at the same temperatures.

The modest temperature-time cycle of the wet procedure is not particularly successful in yielding acceptable white materials, it having been found generally necessary either to extend the heating time or to include a bleaching step. Moreover, the relatively reduced strength of fibrous glass heat-cleaned by the so-called wet procedure has been found to not improve substantially even when the heating is continued for extended lengths of time, i.e. for several hours.

It is concluded, therefore, that the full benefits of the present invention are not achieved at least insofar as the chlorate salts are concerned, unless the treated fabric is substantially dry when introduced into the heating area.

Having thus discussed the main attributes and benefits of the present invention, other attributes and benefits will become apparent upon considerating the following examples.

*Example 1*

A control sample was prepared and tested in the manner set forth hereinafter for purposes of comparison with the results of subsequent examples utilizing the pre-treatment of the invention.

For these purposes a fibrous glass fabric was chosen (style 473) having the following characteristics: 4.4 oz./sq. yd., warp and fill ECDE 150 1/0 1Z fiber glass yarn. Specimens of the greige fabric, without pre-treatment, were heat-cleaned in an air circulating oven at temperatures of 650° F., 700° F., 900° F. and 1000° F. for various times, ranging from a few seconds to several hours. The temperatures and times were chosen to give a wide range of data representative of the behavior of the fabric.

Thereafter each specimen was coated with a finish of an ethylacrylate polymer latex modified by an epoxidized vegetable oil, and then tested for tensile strength and cleanliness. Tensile testing, reported in lbs./in. width, was done according to Owens Corning Fiberglas Corp. Standard Test Methods for Fiberglas Decorative Fabrics, Technical Report No. 175, Test No. DF–509; also ASTM D579–49.

The cleanliness was determined by measuring the whiteness of the fabric with a photoelectric reflection meter, and more particularly a Photovolt model 610 equipped with a green tristimulus filter. This commonly used instrument is designed to measure the diffuse reflection of surfaces, and particularly luminous apparent reflectance, as an indication of degree of whiteness, and is described more fully in Bulletin No. 605, Photovolt Corp., 95 Madison Avenue, New York, N.Y., and in "Color in Business, Science, and Industry," D. B. Judd, 1952, John Wiley & Sons, Inc., to which reference is made.

The instrument was calibrated to a permanent standard comprising a steel plaque having a white porcelain enamel coating. The standard had an instrument reading of 75, and figures below that are considered less white, and those above, it are considered more white.

ple such a treatment yielded an excellent white fabric with a photoelectric reading of 76, thus indicating that acceptable heat-cleaned fabrics should not have readings less than roughly 90% of such a standard.

The tensile strength (at break) and the photoelectric data for the control fabric are given in Table I below.

TABLE 1.—(CONTROL)

| 650° F. | | | 700° F. | | | 900° F. | | | 1,000° F. | | |
| --- | --- | --- | --- | --- | --- | --- | --- | --- | --- | --- | --- |
| Time | Strength, lbs./in. w. | Whiteness | Time | Strength, lbs./in. w. | Whiteness | Time | Strength, lbs./in. w. | Whiteness | Time | Strength, lbs./in. w. | Whiteness |
| Greige | 227 | | Greige | 227 | | Greige | 227 | | Greige | 227 | |
| 15 Sec | 240 | 62 | 15 Sec | 220 | 58 | 6 Sec | 196 | 49 | 5 Sec | 148 | 50 |
| 30 Sec | 229 | 59 | 30 Sec | 195 | 56 | 12 Sec | 151 | 49 | 10 Sec | 122 | 61 |
| 1 Min | 198 | 55 | 1 Min | 181 | 54 | 20 Sec | 132 | 58 | 14 Sec | 112 | 65 |
| 2 Min | 170 | 54 | 2 Min | 169 | 54 | 36 Sec | 128 | 64 | 20 Sec | 108 | 68 |
| 4 Min | 167 | 45 | 4 Min | 163 | 50 | 1 Min | 108 | 68 | 30 Sec | 99 | 70 |
| 9 Min | 134 | 49 | 9 Min | 155 | 53 | 1.75 Min | 110 | 71 | 42 Sec | 95 | 71 |
| 18 Min | 121 | 55 | 18 Min | 140 | 62 | 3 Min | 94 | 72 | 1 Min | 87 | 73 |
| 36 Min | 104 | 60 | 36 Min | 122 | 70 | 5 Min | 91 | 74 | 1.5 Min | 92 | 73 |
| 1.25 Hrs | 96 | 71 | 1.25 Hrs | 104 | 75 | 9 Min | 85 | 75 | 2 Min | 85 | 74 |
| 2.5 Hrs | 98 | 76 | 2.5 | 96 | 75 | 15 Min | 72 | 75 | 3 Min | 89 | 74 |
| 5 Hrs | 89 | 76 | 5 Hrs | 93 | 75 | 25 Min | 75 | 76 | 4.5 Min | 81 | 75 |
| 8 Hrs | 92 | 77 | 8 Hrs | 92 | 75 | 75 Min | 79 | 76 | 10 Min | 76 | 76 |

It was found that photoelectric readings in the range of about 70 to 75 corresponded well with average fabrics that had been heat-cleaned to the point that ignition loss was 0.1% or less. Hence, for ease of experimentation, photoelectric tests were used to give quick determinations of the removal of substantially all the sizing. A reading of about 70 or more indicated that the fabric was clean. A reading of about 70 was found to correspond to an ignition loss of about 0.1% and the fabric color was a fair white. At readings of about 73–74 the color improved to a good white, and at 75 and above the color was an excellent white.

It must be appreciated that the photoelectric meter reading on fabrics can be influenced by changes in the texture of the fabric or even in the design of the meter itself. For this reason it is sometimes helpful, especially when relatively rough or heavy fabrics are being examined, to compare the readings of the subject specimen with those of comparable fabrics of known excellent whiteness. The unheated greige fabric is suitable for this purpose. In the instant example, the greige fabric had a photoelectric reading of 81. This indicates that an acceptable thermally de-sized fabric should not have a photoelectric reading of less than about 85% of that of the greige fabric.

Another excellent white standard is that achieved by heat-cleaning an untreated sample for a relatively long time, say for 4 minutes at 1000° F. In the present exam-

*Example 2*

Specimens of the same style 473 greige fabric as used for the control were treated with a 3% aqueous solution of potassium nitrate in a textile padder, and the excess liquid removed. The fabric wet pick up was about 30% or about 1% on the dry basis. The fabric was then dried.

The dried fabric specimens were then introduced into an air circulating oven at different temperatures ranging from 650° F. to 1000° F. and for various times, ranging from a few seconds to several hours.

Following the heat treatment each sample was immersed in a water bath, then in a 3% acetic acid solution, and then finally in a running water rinse.

After drying, the specimens were finished with the modified acrylic finish referred to in Example 1 and then tested for tensile strength (at break) and whiteness (by the photoelectric method). The results obtained are given in Table 2.

TABLE 2.— (KNO₃)

| 650° F. | | | 700° F. | | | 900° F. | | | 1,000° F. | | |
| --- | --- | --- | --- | --- | --- | --- | --- | --- | --- | --- | --- |
| Time | Strength, lbs./in. w. | Whiteness | Time | Strength, lbs./in. w. | Whiteness | Time | Strength, lbs./in. w. | Whiteness | Time | Strength, lbs./in. w. | Whiteness |
| Greige | 227 | | Greige | 227 | | Greige | 227 | | Greige | 227 | |
| 15 Sec | 253 | 37 | 15 Sec | 253 | 33 | 6 Sec | 192 | 52 | 5 Sec | 141 | 77 |
| 30 Sec | 242 | 36 | 30 Sec | 232 | 38 | 12 Sec | 159 | 76 | 10 Sec | 140 | 78 |
| 1 Min | 238 | 39 | 1 Min | 214 | 47 | 20 Sec | 167 | 76 | 14 Sec | 172 | 77 |
| 2 Min | 214 | 46 | 2 Min | 201 | 55 | 36 Sec | 186 | 79 | 20 Sec | 173 | 77 |
| 4 Min | 191 | 55 | 4 Min | 191 | 67 | 1 Min | 184 | 77 | 30 Sec | 177 | 79 |
| 9 | 195 | 59 | 9 Min | 175 | 72 | 1.75 Min | 181 | 77 | 42 Sec | 158 | 77 |
| 18 Min | 188 | 74 | 18 Min | 205 | 77 | 3 Min | 163 | 77 | 1 Min | 158 | 78 |
| 36 Min | 186 | 77 | 36 Min | 199 | 78 | 5 Min | 162 | 77 | 1.5 Min | 153 | 78 |
| 1.25 Hrs | 195 | 78 | 1.25 Hrs | 198 | 78 | 9 Min | 168 | 78 | 2 Min | 152 | 79 |
| 2.5 Hrs | 204 | 77 | 2.5 Hrs | 196 | 78 | 15 Min | 163 | 78 | 3 Min | 143 | 79 |
| 5 Hrs | 208 | 77 | 5 Hrs | 186 | 79 | 25 Min | 166 | 79 | 4.5 Min | 155 | 78 |
| 8 Hrs | 192 | 78 | 8 Hrs | 186 | 79 | 45 Min | 172 | 78 | 6.5 Min | 156 | 78 |
| | | | | | | 75 Min | 158 | 78 | 10 Min | 145 | 78 |

*Example 3*

The process of Example 2 was repeated except that a 3% solution of rubidium nitrate was used instead of potassium nitrate. The results are given below in Table 3.

*Example 4*

The process of Example 2 was reepated except that a 3% solution of cesium nitrate was used instead of potassium nitrate. The results are given below in Table 4.

TABLE 3.—(RbNO₃)

| 700° F. | | | 900° F. | | | 1,000° F. | | |
|---|---|---|---|---|---|---|---|---|
| Time | Strength, lbs./in. w. | Whiteness | Time | Strength lbs./in.w. | Whiteness | Time | Strength lbs./in. w. | Whiteness |
| Greige | 227 | | Greige | 227 | | Greige | 227 | |
| 15 Sec | 236 | 30 | 6 Sec | 201 | 76 | .5 Sec | 187 | 76 |
| 30 Sec | 220 | 36 | 12 Sec | 176 | 77 | 10 Sec | 159 | 77 |
| 1 Min | 210 | 52 | 20 Sec | 164 | 77 | 14 Sec | 174 | 77 |
| 2 Min | 197 | 74 | 36 Sec | 170 | 78 | 20 Sec | 183 | 78 |
| 4 Min | 181 | 75 | 1 Min | 188 | 77 | 30 Sec | 212 | 77 |
| 9 Min | 225 | 77 | 1.75 Min | 190 | 76 | 42 Sec | 215 | 76 |
| 18 Min | 224 | 77 | 3 Min | 186 | 78 | 1 Min | 212 | 78 |
| 36 Min | 220 | 78 | 5 Min | 199 | 76 | 1.5 Min | 203 | 76 |
| 1.25 Hrs | 204 | 78 | 9 Min | 214 | 79 | 2 Min | 214 | 79 |
| 2.5 Hrs | 224 | 78 | 15 Min | 208 | 78 | 3 Min | 217 | 78 |
| 5 Hrs | 204 | 78 | 25 Min | 196 | 79 | 4.5 Min | 194 | 79 |
| 8 Hrs | 204 | 79 | 45 Min | 171 | 79 | 6.5 Min | 178 | 79 |
| | | | 75 Min | 166 | 79 | 10 Min | 175 | 79 |

TABLE 4.—(CsNO₃)

| 700° F. | | | 900° F. | | | 1,000° F. | | |
|---|---|---|---|---|---|---|---|---|
| Time | Strength, lbs./in. w. | Whiteness | Time | Strength lbs./in.w. | Whiteness | Time | Strength lbs./in. w. | Whiteness |
| Greige | 227 | | Greige | 227 | | Greige | 227 | |
| 15 Sec | 234 | 29 | 6 Sec | 193 | 77 | 5 Sec | 181 | 77 |
| 30 Sec | 233 | 40 | 12 Sec | 182 | 78 | 10 Sec | 159 | 76 |
| 1 Min | 228 | 41 | 20 Sec | 168 | 78 | 14 Sec | 205 | 77 |
| 2 Min | 192 | 66 | 36 Sec | 196 | 79 | 20 Sec | 229 | 77 |
| 4 Min | 188 | 69 | 1 Min | 216 | 78 | 30 Sec | 234 | 77 |
| 9 Min | 204 | 75 | 1.75 Min | 205 | 78 | 42 Sec | 224 | 77 |
| 18 Min | 203 | 78 | 3 Min | 189 | 78 | 1 Min | 232 | 76 |
| 36 Min | 197 | 78 | 5 Min | 213 | 77 | 1.5 Min | 227 | 77 |
| 1.25 Hrs | 184 | 77 | 9 Min | 217 | 78 | 2 Min | 223 | 77 |
| 2.5 Hrs | 166 | 77 | 15 Min | 215 | 78 | 3 Min | 217 | 79 |
| 5 Hrs | 150 | 76 | 25 Min | 196 | 78 | 4.5 Min | 200 | 79 |
| 8 Hrs | 140 | 77 | 45 Min | 189 | 79 | 6.5 Min | 175 | 79 |
| | | | 75 Min | 171 | 79 | 10 Min | 153 | 79 |

It is readily apparent from the data tabulated in Tables 3 and 4 that the cesium and rubidium cation give exceptionally good results when used in accordance with the invention. In each instance, and irrespective of the temperature of heating, there are obtained exceptionally good strength characteristics. For example, in the case of cesium nitrate at 1000° F., there is obtained after only 30 seconds of heating an exceptionally clean white fabric that has a tensile strength as good as the greige fabric. In the case of rubidium nitrate, all specimens could be cleaned free of sizing within a few seconds to a few minutes while maintaining a strength of between about 80% and 90% of the greige fabric.

These data (Tables 3 and 4) also show the inversion in strength loss with subsequent strength increase that characterized the behavior of potassium nitrate as set forth in FIG. 1. Moreover, the strength loss inversion was again found to correspond well with the point at which the fabric became substantially free of sizing as indicated by the whiteness data. The results also suggest, that if processing time is important and strength is not an overriding consideration, the process may be stopped when substantially all the sizing has been removed. However, if both cleanliness and strength are of paramount importance, then heating may be continued for a period of time to take advantage of the increasing strength characteristics.

Although the data of Tables 3 and 4 indicate that the rubidium and cesium cations give a performance slightly better than potassium, the latter is preferred because it is comparatively much less expensive.

*Example 5*

The same procedure was used as described above in Example 2 except that a 3% aqueous solution of sodium nitrate was used in place of potassium nitrate. The results are given in Table 5.

The sodium cation exhibits the same general characteristics that the potassium cation does. However, it is evident that the sodium cation shows considerably better strength properties at the lower temperature levels than it does at the higher temperature levels. At 650° F., for instance, the sodium treated sample was substantially clean after 18 minutes of heating and had a strength of 220 lbs./in. width. By way of comparison, the potassium treated sample (Table 2) was also clean after 18 minutes, but had a strength of 188 lbs./in. width.

On the other hand, at 1000° F. the cleaned sodium-treated specimen did not succeed in reducing the strength loss quite as successfully as did the corresponding potassium-treated specimen, even though it was much stronger than the control. It is apparent, therefore, that the selection of the best cation may depend upon the requisite operating temperature.

TABLE 5.—(NaNO₃)

| 650° F. | | | 700° F. | | | 900° F. | | | 1,000° F. | | |
|---|---|---|---|---|---|---|---|---|---|---|---|
| Time | Strength, lbs./in. w. | White-ness | Time | Strength, lbs./in. w. | White-ness | Time | Strength, lbs./in. w. | White-ness | Time | Strength, lbs./in. w. | White-ness |
| Greige | 227 | --------- | Greige | 227 | --------- | Greige | 227 | --------- | Greige | 227 | --------- |
| 15 Sec | 263 | 43 | 15 Sec | 232 | 31 | 6 Sec | 229 | 54 | 5 Sec | 177 | 77 |
| 30 Sec | 233 | 34 | 30 Sec | 207 | 37 | 12 Sec | 203 | 75 | 10 Sec | 167 | 78 |
| 1 Min | 231 | 37 | 1 Min | 217 | 41 | 20 Sec | 180 | 78 | 14 Sec | 168 | 78 |
| 2 Min | 213 | 44 | 2 Min | 224 | 50 | 36 Sec | 158 | 78 | 20 Sec | 164 | 78 |
| 4 Min | 207 | 51 | 4 Min | 199 | 62 | 1 Min | 174 | 78 | 30 Sec | 159 | 78 |
| 9 Min | 219 | 56 | 9 Min | 197 | 78 | 1.75 Min | 171 | 78 | 42 Sec | 151 | 76 |
| 18 Min | 220 | 71 | 18 Min | 183 | 76 | 3 Min | 154 | 78 | 1 Min | 131 | 79 |
| 36 Min | 206 | 76 | 36 Min | 154 | 77 | 5 Min | 151 | 78 | 1.5 Min | 129 | 79 |
| 1.25 Hrs | 201 | 78 | 1.25 Hrs | 157 | 77 | 9 Min | 145 | 78 | 2 Min | 134 | 77 |
| 2.5 Hrs | 183 | 79 | 2.5 Hrs | 153 | 77 | 15 Min | 134 | 78 | 3 Min | 121 | 78 |
| 5 Hrs | 174 | 78 | 5 Hrs | 160 | 78 | 25 Min | 121 | 78 | 4.5 Hrs | 118 | 78 |
| 8 Hrs | 192 | 78 | 8 Hrs | 173 | 78 | 45 Min | 119 | 78 | 6.5 Hrs | 96 | 79 |
|  |  |  |  |  |  | 75 Min | 117 | 78 | 10 Min | 83 | 79 |

*Example 6*

Example 2 was repeated except that a 3% solution of potassium chlorate was used instead of the potassium nitrate. The results are given in Table 6.

As referred to before in connection with FIG. 2, the results obtained when using the chlorate anion are slightly different than those obtained by using a nitrate anion, and the separate data points are more scattered even though they indicate a marked and significant improvement in strength over the control. This behavior of the chlorate is believed to be associated with the infusibility of the chloride to which it is readily decomposed. Because of this, the nitrate anion is preferred over the chlorate, though both are considered satisfactory, as is any anion decomposable by heat to form oxygen, e.g. bromate, iodate, persulphate, and the like.

*Example 8*

A casement type fiber glass fabric style 429 (4.4 oz./sq. yd. warp and fill ECDE 150 1/0 1Z fiber glass yarn) was treated with 5% solutions, respectively, potassium nitrate, rubidium nitrate and cesium nitrate.

Specimens of each of these treated fabrics were dried at moderate temperatures and then heated at 1000° F. for various lengths of time as was a control specimen. The heat treated specimens were then coated with a finish based on an ethylacrylate polymeric latex of the type marketed under the trademark Rhoplex HA4 and tested for Mullen Burst Strength according to the Owens Corning Fiberglass Corp. Standard Test Methods for Fiberglas Decorative Fabrics, Technical Report No. 175, Apr. 2, 1962, O.C.F. Test #DF511.

The samples were cleaned to an excellent white color

TABLE 6.—(KClO₃)

| 650° F. | | | 700° F. | | | 900° F. | | | 1,000° F. | | |
|---|---|---|---|---|---|---|---|---|---|---|---|
| Time | Strength, lbs./in. w. | White-ness | Time | Strength, lbs./in. w. | White-ness | Time | Strength, lbs./in. w. | White-ness | Time | Strength, lbs./in. w. | White-ness |
| Greige | 227 | --------- | Greige | 227 | --------- | Greige | 227 | --------- | Greige | 227 | --------- |
| 15 Sec | 268 | 31 | 15 Sec | 231 | 32 | 15 Sec | 227 | 33 | 5 Sec | 147 | 50 |
| 30 Sec | 263 | 35 | 30 Sec | 229 | 34 | 30 Sec | 224 | 35 | 10 Sec | 136 | 61 |
| 1 Min | 237 | 37 | 1 Min | 223 | 36 | 1 Min | 215 | 41 | 14 Sec | 138 | 65 |
| 2 Min | 231 | 39 | 2 Min | 199 | 41 | 2 Min | 190 | 62 | 20 Min | 144 | 68 |
| 4 Min | 219 | 42 | 4 Min | 183 | 60 | 4 Min | 169 | 73 | 30 Min | 130 | 70 |
| 9 Min | 188 | 60 | 9 Min | 152 | 71 | 9 Min | 179 | 76 | 42 Sec | 154 | 71 |
| 18 Min | 178 | 67 | 18 Min | 158 | 75 | 18 Min | 194 | 77 | 1 Min | 139 | 73 |
| 36 Min | 166 | 70 | 36 Min | 149 | 72 | 36 Min | 179 | 77 | 1.5 Min | 147 | 73 |
| 1.25 Hrs | 173 | 73 | 1.25 Hrs | 154 | 76 | 1.25 Hrs | 179 | 77 | 2 Min | 146 | 74 |
| 2.5 Hrs | 158 | 75 | 2.5 Hrs | 149 | 76 | 2.5 Hrs | 176 | 76 | 3 Min | 153 | 74 |
| 5 Hrs | 153 | 75 | 5 Hrs | 159 | 76 | 5 Hrs | 179 | 76 | 4.5 Min | 134 | 75 |
| 8 Hrs | 146 | 78 | 8 Hrs | 144 | 77 | 8 Hrs | 179 | 77 | 6.5 Min | 126 | 76 |
|  |  |  |  |  |  |  |  |  | 10 Min | 131 | 76 |

*Example 7*

Example 2 was repeated except that a 3% solution of lithium nitrate was used in place of the potassium nitrate. In this case, the separate specimens of fabric showed rapid and complete strength failure at all temperatures.

after about 10 seconds exposure, and were noticeably whiter than the control sample after the latter had been exposed for 60 seconds, which was the time required to clean the control sample to an acceptable white color. In each instance, as well, the Mullen Burst Strength was found to be well above that of the control, and even in excess of the original greige fabric.

Example 9

A speciment was given a pre-treatment, with a 5% solution of potassium nitrate as described in Example 8, dried, and then heat-cleaned at 1050° F., as was a control fabric. After 3 seconds the treated fabric was clean and had a Mullen Burst Strength, when finished, of 386 p.s.i. The control was clean after 30 seconds and had a Mullen Burst Strength of 270 p.s.i. The greige strength was 371 p.s.i.

Example 10

Casement style glass fabric style 429 (4.4 oz/sq. yd., warp and fill ECDE 150 1/0 1Z) was treated with a 10% aqueous solution of potassium nitrate in a textile padder. A wet pick up of 30% resulted in a dry application of approximately 3% by weight of the salt.

The dried fabric was exposed in an air circulating oven for 1 hour at 700° F. The heat treated fabric was then washed in water to remove soluble salts and was finished with acrylic latex finish to protect the fibers against self-abrasion.

The finished fabric had a Mullen Burst Strength of 547 p.s.i. in comparison with 354 p.s.i. for the greige fabric. The treated fabric was exceptionally clean and white.

Example 11

Style 429 casement fabric as described in Example 10 was treated with a 5% potassium nitrate aqueous solution in a textile padder with approximately 30% wet pick up.

The dried fabric was passed continuously through a laboratory muffle furnace (4 inches long in the direction of fabric travel) at 1000° F. at a speed of 1⅛ yards/minute. The fabric was then washed and finished with acrylic latex finish. The Mullen Burst Strength of the finished fabric was 406 p.s.i. and the fabric was exceptionally white.

In the various processes described above for treatment of the fiber glass in accordance with the present invention, a fabric has been the end product. In those instances where fiber glass fabrics are to be treated in accordance with the present invention, one method of applying the salts disclosed herein is from an aqueous solution. The aqueous bath which is used should contain a concentration of salt in a range from about 1% to 10% by weight. In the conventional padding technique the weight pick up of the fabric is about 30% liquid per unit weight of the dried cloth. Thus, when using a 10% solution, with a pick up of 30%, there would be approximately 3% salt by weight based on the dried fabric.

In general, the salt pickup, on a dry basis, should be at least 0.3% by weight of the glass fibers treated in accordance with the present invention. In other words, if potassium nitrate is to be applied to glass fibers in fabric form, the potassium nitrate should be present on the fiber glass to an extent equal to at least approximately 0.3% by weight based on the glass fibers to achieve a notable improvement. Preferably, the salt pick up should be in the approximate range 1 to 5% by weight. Greater amounts may, however, be required to obtain uniform distribution of the dried treatment on the surface of the filaments.

Following the impregnation of the fabric with the aqueous salt solution, the fabric is dried. This step avoids the deleterious effects upon tensile strength that accompany wet introduction of the fabric. Moreover, it is to be appreciated that the introduction of large amounts of water into the high temperature oven would make it very difficult to maintain the desired temperature in the oven.

The salts may also be applied to the fabric from a hot melt, or may be distributed in granular form over the surface of the fabric and then be fused. The manner of application is not material so long as the distribution is relatively uniform.

The salts of the present invention may also be added to the starch oil size which is commonly applied to fiber glass yarns in the first step of their manufacture. This is advantageous because the salts are then present on both warp and filling yarns without the necessity of any additional treating operation.

In the processing of glass fiber fabrics according to the invention it has been found highly advantageous to follow the heat treatment with an acetic acid wash. Thorough washing at this stage is required in order to avoid embrittlement and weakening of the glass fibers—a result that is apparently caused by self-abrasive damage by inorganic residues. These residues also tend to stiffen the hand of the fabric and inhibit finish pick up. Ordinary washing with water frequently fails to remove all of these inorganic residues. Thorough water washing is satisfactory, but is expensive and time consuming. However, by interposing an acetic acid bath these problems are minimized. Apparently the inorganic residues are converted to acetate salts that are much more soluble in water, with the result that subsequent waterwashing removes considerably more residue. Moreover, even relatively poor washing of the acetic bath treated fabric does not degrade the fabric strength since the acetate salts are relatively soft and non-abrasive. Wetting agents may also be added to the acid bath or wash water to assist in removal of the inorganic residues.

For this purpose, an acetic acid wash bath of 1 to 10% is generally satisfactory. A concentration of about 20 to 60% of that of the alkali salt solution is preferred. An excess of acetic acid is not harmful provided the washed fabric is adequately dried.

In another embodiment of the invention, the salts can be applied to the warp yarns only during the conventional warp sizing step. For treatment in this manner, the salts of the present invention are added to a warp sizing as a component thereof, and the fiber glass yarns are treated in the usual manner. Thus, the salts of the invention are present on the warp yarns together wih the sizing material. The fabric is then woven and during the cleaning step the salts exhibit the same effect as if they were applied to the fabric itself. Example 12, below, embodies this method of treatment.

Example 12

A warp consisting of ECDE 150 1/0 1Z fiber glass yarn was slashed with a warp sizing containing equal amounts of polyvinyl alcohol and potassium nitrate dissolved in water. The pickup of potassium nitrate was approximately 1.5% on the weight of the warp yarns.

A second warp, serving as a control, was slashed with a similar warp sizing containing no potassium nitrate.

Both warps were woven into style 841 casement type fabric (4.4 oz./sq. yd., warp and fill ESDE 150 1/0 1Z, fiber glass yarn).

The control fabric was passed at 100 feet/minute through a 6 foot long heat-cleaning oven maintained at a temperature of 1230° F.

The fabric containing potassium nitrate in the warp sizing was processed through the same heat-cleaning oven maintained at a temperature of 1190° F. at 172 feet/minute.

The two fabrics were finished identically with an acrylic latex finish.

Table 7 is a comparison of the strength and whiteness of these two fabrics.

TABLE 7

|  | Whiteness [1] | Mullen Burst Strength, P.s.i.[2] | Tensile Strenght,[3] P.s.i. | | Tensile Strength [4] After Static Fold, P.s.i. | |
| --- | --- | --- | --- | --- | --- | --- |
|  |  |  | Warp | Fill | Warp | Fill |
| Fabric with Potassium Nitrate in Warp Sizing | .932 | 260 | 118 | 108 | 115 | 102 |
| Control Fabric | .845 | 181 | 100 | 80 | 77 | 54 |

[1] Photoelectric tristimulus data obtained with a Bausch and Lomb Optical Co. Spectronic 20 Color Analyzer. Photoelectric tristimulus data reduced to whiteness value according to National Bureau of Standards circular C–429, R. S. Hunter (7/30/42), using equation (19)

$$W = 1 - \left( \left[ 30\sqrt{\alpha^2+\beta^2} \right]^2 + \left[ \frac{1.00-Y}{2} \right]^2 \right)^{1/2}$$

where $W=1$ for a MgO standard and $W=0$ for black.
[2] Owens Corning Fiberglas Corp. Standard Methods of Test for Fiberglas Decorative Fabrics, Technical Report No. 175. Test No. DF–511, Owens Corning Fiberglas Corp., Textile Product Development Laboratory, Ashton, R.I.
[3] Owens Corning Fiberglas Corp. Standard Methods of Test for Fiberglas Decorative Fabrics, Technical Report No. 175. Test No. DF–509 also ASTM D579-49.
[4] Owens Corning Fiberglas Corp. Standard Methods of Test for Fiberglas Decorative Fabrics, Technical Report No. 175. Test No. DF–505.

The data of Tables 2 and 5 indicate that the sodium and potassium ions exhibit their strength-increasing characteristics at different points in time for the same temperature. This suggests that combinations of cations may be used to even further enhance the strength improvements of the present invention. The following Example 13 deals with this aspect.

Example 13

Three specimens of the same fabric as described in Example 1 were treated with an aqueous solution comprising 3% potassium nitrate and 1.25% sodium nitrate. The fabric was squeezed, dried and heat-cleaned at 1040° F. for five seconds. The finished fabrics were white and had tensile strengths of 216, 223 and 220 lbs./in. width, respectively. The strengths thus obtained (97% of the greige strength) are much greater than could be expected for either the potassium or sodium cation applied independently under the same conditions.

From all of the data presented in the foregoing Examples, it appears that the identity of the cation portion of the oxidizing salt has a very definite effect on the tensile strength of the fabric. It appears that as the ionic diameter of the cation of the pre-treatment salt increases, the strength of the fabric increases. Although the phenomenon is not completely understood, it is theorized that as the sizing is removed by the heat treatment, the small quantities of alkali metal in the glass migrate to the fiber surface and are lost, resulting in loss of fiber strength. When a cation according to the invention is applied, however, there may occur, after removal of the sizing, an ion exchange whereby the cation replaces the migrating alkali metals in the glass. As a result strength loss is terminated or even reversed.

Simultaneously with the above effects, the nitrate, chlorate and other oxidizing agent releases oxygen at the surface of the glass where it immediately combines with the organic sizing materials and assists in their rapid oxidation and removal. The two materials working together, cation and anion, effectively and quickly yield a heat-cleaned fabric of remarkably good strength.

Many industrial fabrics are commonly heat-cleaned by placing rolls of fabric in a batch type oven and slowly raising the temperature of 500–700° F. The temperature is maintained in the oven for a total of 48–80 hours. The use of the pre-treatment in accordance with this invention will permit a reduction in oven time and will provide an improvement in strength when used in the batch oven process.

In continuous heat-cleaning processes, furnace temperatures are generally kept at a somewhat higher level, i.e. commonly from 1150°–1350° F., and sometimes up to about 1500° F. However, due to the extremely fast de-sizing times permitted by the present invention, the duration of exposure becomes critical and cannot be controlled very carefully above about 1250° F. on presently available equipment. Moreover, at very high temperatures, a greater percentage of time is consumed in heating up the fabric, and the fabric may not even reach the operating temperature of the oven before it has left the heating zone. Consequently, although temperatures above 1250° F. are contemplated herein, such temperatures represent a practical upper limit.

On the other hand, very low temperatures may take an inordinately long time to provide adequate de-sizing in a continuous heat-cleaning process. A temperature of about 600° F. represents a practical lower limit for most purposes. In any event, the temperature must be sufficiently high to fuse the metal salt.

The actual selection of the precise time and temperature of operation will be in large part dependent on the type of fabric being treated and its end use. Where strength is the primary consideration, such as in the industrial field, the time of exposure would be extended sufficiently to give maximum strength; further improvements may be achieved by operating at lower temperatures. However, if cleanliness and speed are the overriding considerations, one could select a high temperature and a time of exposure less than that required to get maximum strength.

It is to be appreciated that the process of this invention can be applied equally well to all types of fiber glass including yarns, rovings and the like. In accordance with the principles of the present invention, the strength of such forms of glass fabrics is substantially increased.

Although the present invention is described above in terms of specific examples and illustrative embodiments, it is to be appreciated that the processes disclosed may be altered by one skilled in the art without departing from the spirit and scope of the invention.

What is claimed is:
1. The method of heat-cleaning a cation-containing fibrous glass to remove the sizing material on the surfaces thereof comprising the steps of treating the glass with an oxidizing salt having a cation selected from the group consisting of potassium, sodium, cesium and rubidium, said selected cation being at least as large in atomic radius as a cation in said fibrous glass, and then introducing the glass, while dry, to an area wherein the glass is heated to a temperature of between about 600° to 1250° F. for a period of time at least sufficient to remove substantially all of the sizing material and to yield a cleaned fibrous glass having a tensile strength of not less than about 60% of that of the greige fibrous glass.

2. The method according to claim 1 wherein the oxidizing salt is selected from the group consisting of nitrate and chlorate.

3. The process according to claim 1 wherein the oxidizing salt is applied to the fibrous glass as a mixture with the sizing material.

4. The method according to claim 1 wherein after heating the glass for a period of time sufficient to remove substantially all the sizing, the heating is continued at least until the tensile strength of said glass is increasing with time.

5. The method according to claim 1 wherein the glass is heated for a period of time sufficient to produce a whiteness thereon which in terms of luminous apparent reflectance is at least 90% as white as the greige fabric.

6. The method according to claim 1 wherein said fibrous glass is treated with said oxidizing salt by impregnating said fibrous glass with an aqueous solution of said salt, and thereafter drying said impregnated fibrous glass prior to the introduction thereof in the heating area.

7. The method according to claim 1 wherein the glass is treated with a mixture of oxidizing salts comprising two or more of said cations.

8. The method according to claim 7 wherein the glass is treated with a mixture of sodium nitrate and potassium nitrate.

9. The method of heat-cleaning a cation containing fibrous glass to remove the sizing material on the surfaces thereof comprising the steps of treating the glass with an oxidizing salt having a cation selected from the group consisting of potassium, sodium, rubidium and cesium, said selected cation being at least as large in atomic radius as a cation in said fibrous glass, and then introducing the glass, while dry, to an area wherein the glass is heated to a temperature sufficient to fuse the oxidizing salt and to burn off said sizing material, said temperature being maintained for a period of time at least sufficient to remove substantially all of the sizing material from said glass and to yield a fibrous glass having a tensile strength of not less than about 60% of that of the greige fibrous glass, and then washing the inorganic residues from said glass.

10. The thermally de-sized fibrous glass material prepared in accordance with the process of claim 9.

References Cited

UNITED STATES PATENTS

| | | | |
|---|---|---|---|
| 2,674,549 | 4/1954 | Balz | 134—2 |
| 2,779,136 | 1/1957 | Hood et al. | |
| 3,232,788 | 2/1966 | Morzocchi et al. | |

OTHER REFERENCES

Stresses in Glass Produced by Nonuniform Exchange of Monovalent Ions, pages 59–68 of the Journal of Pm. Ceramic Society, vol. 45, No. 2, by S. S. Kistler. Measurement of the Mechanical Strength of Glass After Reinforcement, by Acloque and J. Tochon.

U.S.C.V. Symposium sur la Resistance Mechanique du Verre et les Moynes de l'ameliorer (1961), pp. 687–704.

DONALL H. SYLVESTER, *Primary Examiner.*

R. L. LINDSAY, *Assistant Examiner.*

UNITED STATES PATENT OFFICE
CERTIFICATE OF CORRECTION

Patent No. 3,375,155                          March 26, 1968

Richard G. Adams

It is hereby certified that error appears in the above numbered patent requiring correction and that the said Letters Patent should read as corrected below.

Column 3, line 25, "gabric" should read -- fabric --; line 29, before "strong" insert -- as --. Column 4, line 52, "valve" should read -- value --. Column 6, line 43, "considerating" should read -- considering --. Column 8, line 73, "reepated" should read -- repeated --. Columns 11 and 12, TABLE 5, tenth column, line 12 thereof, "4.5 Hrs." should read -- 4.5 Min. --; same column, line 13, "6.5 Hrs." should read -- 6.5 Min. --. TABLE 6, tenth column, line 5 thereof, "20 Min." should read -- 20 Sec. --; same TABLE 6, tenth column, line 6 thereof, "30 in." should read -- 30 Sec. --. Column 13, line 6, "speciment" should read -- specimen --; line 54, "weight" should read -- wet --. Column 14, line 46, "wih" should read -- with --; line 63, "ESDE" should read -- ECDE --. Columns 15 and 16, TABLE 7, third and fourth columns, in the heading, line 1 thereof, "Strenght, $^3$" should read -- Strength,$^3$ --. Column 18, line 13, "Morzocchi" should read -- Marzocchi --; line 17, "Pm." should read -- Am. --.

Signed and sealed this 23rd day of September 1969.

(SEAL)
Attest:

EDWARD M. FLETCHER, JR.                      WILLIAM E. SCHUYLER, JR.
Attesting Officer                                Commissioner of Patents